United States Patent
Ji et al.

(10) Patent No.: US 11,783,452 B2
(45) Date of Patent: Oct. 10, 2023

(54) TRAFFIC MONITORING USING DISTRIBUTED FIBER OPTIC SENSING

(71) Applicant: NEC Laboratories America, Inc., Princeton, NJ (US)

(72) Inventors: Philip Ji, Cranbury, NJ (US); Eric Cosatto, Red Bank, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 258 days.

(21) Appl. No.: 17/221,814

(22) Filed: Apr. 4, 2021

(65) Prior Publication Data

US 2021/0312801 A1    Oct. 7, 2021

Related U.S. Application Data

(60) Provisional application No. 63/006,225, filed on Apr. 7, 2020.

(51) Int. Cl.
| | | |
|---|---|---|
| G06T 5/00 | (2006.01) | |
| G08G 1/04 | (2006.01) | |
| G06V 20/54 | (2022.01) | |
| G06T 11/20 | (2006.01) | |
| G06T 5/20 | (2006.01) | |
| H04B 10/071 | (2013.01) | |
| G06V 10/44 | (2022.01) | |
| G06F 18/232 | (2023.01) | |
| G06V 10/764 | (2022.01) | |

(52) U.S. Cl.
CPC .......... *G06T 5/002* (2013.01); *G06F 18/232* (2023.01); *G06T 5/20* (2013.01); *G06T 11/203* (2013.01); *G06V 10/457* (2022.01); *G06V 10/764* (2022.01); *G06V 20/54* (2022.01); *G08G 1/04* (2013.01); *H04B 10/071* (2013.01); *G06T 2207/20081* (2013.01); *G06T 2207/20084* (2013.01); *G06T 2207/30236* (2013.01)

(58) Field of Classification Search
None
See application file for complete search history.

(56) References Cited

U.S. PATENT DOCUMENTS

| | | | | |
|---|---|---|---|---|
| 10,352,763 | B2 * | 7/2019 | McEwen-King | G01H 9/004 |
| 2011/0069302 | A1 * | 3/2011 | Hill | G01D 5/35361 356/73.1 |
| 2014/0362668 | A1 * | 12/2014 | McEwen-King | B61L 23/06 367/118 |
| 2015/0013465 | A1 * | 1/2015 | Godfrey | B61L 23/04 73/655 |
| 2018/0340801 | A1 * | 11/2018 | Kelley | G01H 9/004 |
| 2018/0342156 | A1 * | 11/2018 | Martin | G08G 1/052 |
| 2020/0172130 | A1 * | 6/2020 | Esprey | B61L 25/025 |
| 2020/0401784 | A1 * | 12/2020 | Salemi | G06V 10/30 |
| 2021/0107769 | A1 * | 4/2021 | Witczak | B66B 5/0025 |
| 2023/0028676 | A1 * | 1/2023 | Huang | G01H 9/004 |

OTHER PUBLICATIONS ravensoundsoftware.com "Adjusting spectrogram parameters and display in Raven Pro" (Year: 2019).*

* cited by examiner

*Primary Examiner* — Randolph I Chu
(74) *Attorney, Agent, or Firm* — Joseph Kolodka

(57) ABSTRACT

Aspects of the present disclosure describe distributed fiber optic sensing (DFOS) systems, methods, and structures that advantageously provide traffic monitoring, and traffic management which improves the safety and efficiency of a roadway.

7 Claims, 16 Drawing Sheets

TRAFFIC MONITORING USING DISTRIBUTED FIBER OPTIC SENSING

CROSS REFERENCE

This disclosure claims the benefit of U.S. Provisional Patent Application Ser. No. 63/006,225 filed 7 Apr. 2020 the entire contents of which is incorporated by reference as if set forth at length herein.

TECHNICAL FIELD

This disclosure relates generally to distributed fiber optic sensing (DFOS) applications directed to traffic monitoring.

BACKGROUND

As is known, traffic monitoring on roadways is an important task for urban planning and development, congestion control, and accident prevention and response. Monitored traffic conditions may affect public safety services, emergency services, and general public services in addition to economic operation(s).

SUMMARY

An advance in the art is made according to aspects of the present disclosure directed to distributed fiber optic sensing systems (DFOS), methods, and structures that advantageously provide traffic-including those carrying live telecommunications traffic.

According to aspects of the present disclosure, a DFOS system according to the present disclosure for traffic monitoring includes a deployed optical fiber—disposed along a roadway; a distributed fiber optic sensor system including interrogator for distributed acoustic sensing (DAS) or distributed vibration sensing (DVS) that detects a vibration signal along the optical fiber and produces a waterfall signal image continuously in real time; optional signal processing systems and methods that reduce noise of detected vibration signal; an intelligent image analysis system and/or module that processes the waterfall image and outputs clear vehicle traces from noisy waterfall data; and processing to determine traffic information from the vehicle traces which may be advantageously employed in smart city or other applications.

BRIEF DESCRIPTION OF THE DRAWING

A more complete understanding of the present disclosure may be realized by reference to the accompanying drawing in which.

DESCRIPTION

Figure 1:
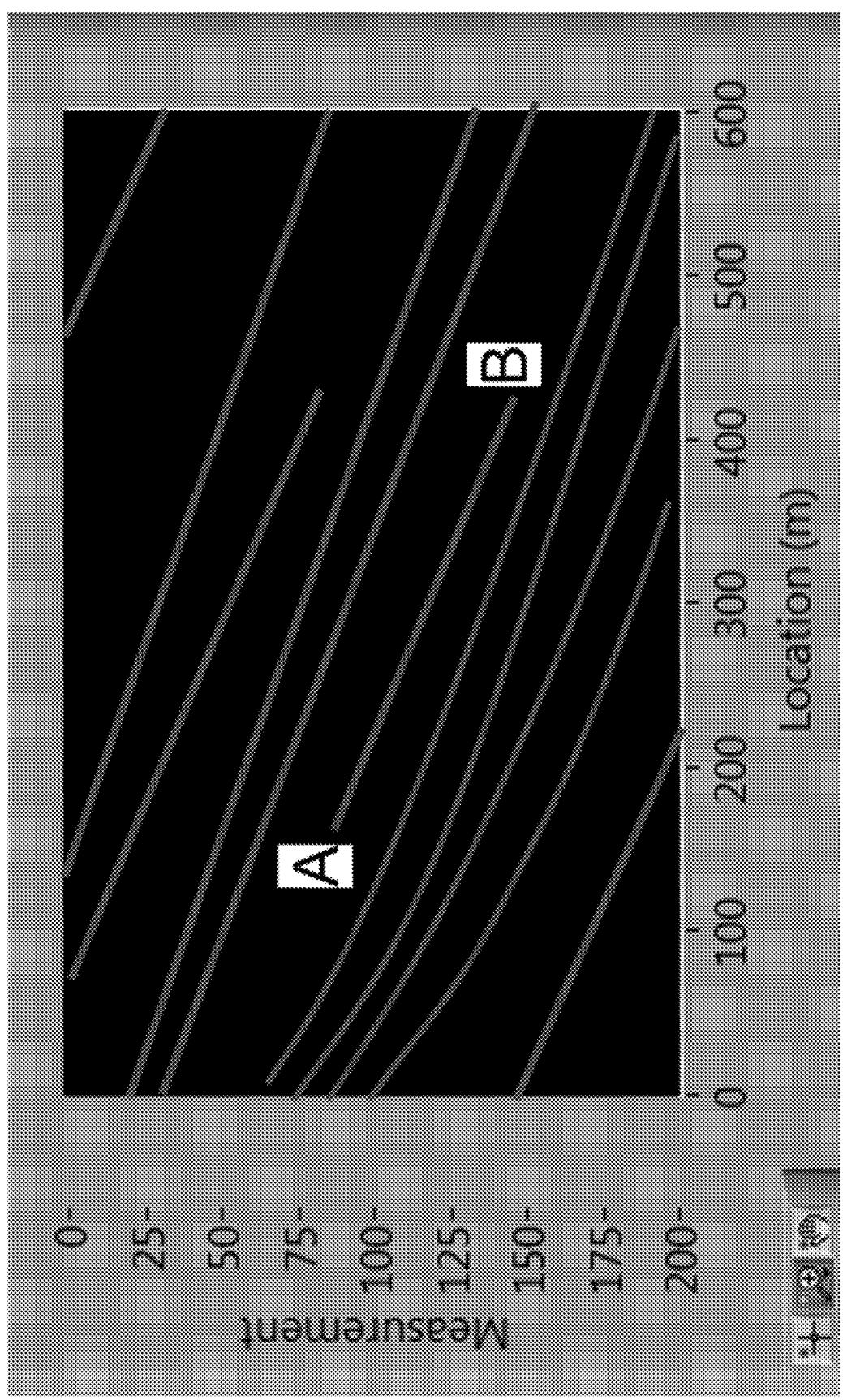
FIG. 1 is a plot showing an illustrative ideal waterfall chart from a traffic sensor according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

With respect to the present disclosure, we describe systems, methods, structures (solutions) that advantageously produce continuous, real-time traffic information along an entire roadway using existing, deployed, regular grade communication optical fiber (fiber optic cable) via distributed fiber optic sensing (DFOS)—that may include distributed vibration sensing (DAS) and/or distributed vibration sensing (DVS). As we shall show and describe—in addition to sensing hardware, the present disclosure describes an intelligent vehicle trace extraction method and subsequent trace processing that advantageously derives useful traffic information from DFOS data.

At this point we may now provide an operational outline components/features exhibited by systems, methods, and structures according to aspects of the present disclosure that provide real-time traffic information using DOFS.

Existing Optical Cable and Optical Fiber Along the Roadway

Of particular advantage, systems, methods, and structures according to aspects of the present disclosure may utilize fiber optic cables deployed along a roadway to produce/convey traffic information. As will be understood and appreciated, existing fiber optic cables that are already field deployed along a roadway including, for example metro and/or long haul telecommunication cables, highway communication cables, utility cables with optical fiber inside (i.e., optical ground wire), etc., may all be employed in systems, methods, and structures according to the present disclosure—including those actively carrying other traffic.

We note that since these fiber are cables were deployed previously for non-sensing purposes (mainly for data communication purpose), they are not specially installed to enhance a sensing function. Accordingly, such existing cables are generally deployed (laid) along to the roadway in a manner such that they do not exhibit special configurations such as coils or helical layouts, and do not include any special mechanical elements that would enhance vibration sensitivity. These cables are usually buried underground, either through direct burial or located within a conduit and located either next to the roadway (adjacent/along) or under the middle of the roadway. When so located, a vehicle traffic direction is substantially parallel to the cable. Of particular advantage—by utilizing existing, pre-deployed fiber optic cables—there is no need to deploy new cables for our sensing and traffic monitoring purposes. This significantly reduces labor cost and operational complexity and expedites system deployment and operation time.

Distributed Fiber Optic Vibration Sensor

Another element employed in systems, methods, and structures according to aspects of the present disclosure is a distributed fiber optic sensor (system). As is known, such sensor(s) are oftentimes called distributed acoustic sensor (DAS) or distributed vibration sensor (DVS), depending on different definitions and naming methods. As used herein however, "DAS" and "DVS", refer to sensors with certain respective differences and are described in more details below.

Operationally, the DAS/DVS system (alternatively referred to as "the sensor" below, also called "the interrogator") includes an optical output port in optical communication with an optical fiber that is generally located as part of an optical cable deployed along a roadway. The interrogator includes a coherent optical source (such as a laser with narrow pulse width). The output of the optical source is modulated by an electro-optic modulator (such as an acousto-optic modulator or a semiconductor optical amplifier, etc.) or a combination of multiple modulators to create a periodic pulse train. We note and those skilled in the art will appreciate that the pulse frequency is related to the length of the sensing fiber in order to ensure that all Rayleigh backscattering signals are returned from the entire fiber length (even the furthest end) for an incident optical pulse before a next pulse is sent. The pulse duration is adjusted taking into consideration the targeted spatial resolution of the sensing signal and the optical signal power level.

The periodical optical pulse is then amplified optically (optional) and sent to the sensing fiber through a fiber optic circulator device. The Rayleigh backscattering signal of the pulse from the sensing fiber will be returned back to the sensor (that is why it is called "backscatter"). The optical circulator routes the returned Rayleigh backscattering signal to the third port of the circulator. This signal is then amplified (optional) and sent to an optical receiver. Because the backscattering signal generated at different locations of the sensing fiber will travel different distances before reaching the optical receiver (i.e. different time of flight), the backscattering signal generated at each location can be differentiated temporally.

For DVS—as that term is used herein—the optical receiver may include a photodetector, which converts an optical signal to an electrical signal and then typically amplifies it. The electrical signal is then digitized (i.e. converted from analog signal to digital signal) through an analog-to-digital converter (ADC), and is then sent to a processor/computer to determine/ascertain any vibration signals. When vibrations occur at certain location(s) along the sensing fiber, the intensity of the backscattering signal corresponding to those location(s) will vary. Therefore, by analyzing the variation of the intensity of the received optical signal at each location, the vibration information along the entire fiber can be obtained.

For DAS—as that term is used herein—the optical receiver includes an optical interferometer device which demodulates the phase of the received optical signal. Such demodulator device can be—for example—a 3×3 optical coupler, or a phase-generated carrier (PGC) demodulator, or an optical coherent receiver, or a delayed optical hybrid phase demodulator, etc., —as well as other structures. In such a demodulator, the phase change of the optical signal within a certain length of the media can be obtained through the interference method. Since the phase change is also related to the vibration at the corresponding section of sensing fiber, the vibration information at each location along the entire fiber can be obtained.

As those skilled in the art will understand and appreciate, both DAS and DVS provide a distributed sensing function for vibration(s) that occur along an entire length of sensing fiber/cable. According to aspects of the present disclosure—any differences in parameters and methods used to obtain vibration information, i.e., between DAS and DVS is not important. Therefore, for simplicity, we call the sensor as "DAS" for generalized distributed acoustic sensing which advantageously may be DAS or DVS or even combinations thereof—depending upon application requirements.

We note that the brief descriptions noted above of DAS/DVS interrogators are merely general configurations. Other optional or less critical components, such as optical and electrical filters, optical splitter for power monitoring, optical switches, drivers, electric power conditioning device, connectors and adapters, etc., are not included, but can be part of any sensor hardware and systems employed according to aspects of the present disclosure.

Acquiring the Waterfall Plot

One commonly used display method of real-time vibration data/information along a sensing fiber is a "waterfall" plot, as illustrated in FIG. 1. The X-axis refers to a location along the sensing fiber, and the Y-axis is the time. The Z-axis (i.e. the color of each pixel on the chart) corresponds to the amplitude of the vibration at that location at that time. For each round of a new measurement (i.e. sending a pulse down the fiber, receiving the corresponding backscattering signal, processing and calculating the vibration signal), one horizontal time is produced at the top. The older measurement data will be pushed down, in a waterfall-like fashion. It is common practice to accumulate and/or average results from several consecutive measurement periods to reduce the amount of data and refresh rate.

In an ideal case, a waterfall plot obtained from the DAS along the roadway with vehicle traffic should look like that shown in FIG. 1. On this plot, the colored lines correspond to the vehicles travelling along the roadway. In particular, one line shows the movement of one vehicle (or one axle). The line from A to B indicates that a vehicle moved from location A at time A to location B at time B. The slope of that line indicates the direction, speed, and movement (e.g. acceleration or deceleration) of the vehicle.

Unfortunately, however, an actual waterfall plot received from the DAS is usually not as clean as that illustratively shown in the figure. In general, the Rayleigh backscattering signal from the optical fiber is much weaker than the incident light (tens of decibels lower). Also, in order to capture fast vibration events, it is not suitable to accumulate a signal over a longer duration. Therefore, the obtained vibration signal is oftentimes noisy.

Furthermore, since the Rayleigh scattering is a random process, the intensity of a Rayleigh scattering signal and/or the phase change from the Rayleigh scattering can be exceptionally low at certain locations at certain periods of time. Therefore, the vibration information obtained by the DAS/DVS can be weak at certain locations at certain periods of time (spots). There are various techniques to mitigate such noisy signal and weak spots, however they require costly and complex hardware (such as use multiple lasers, etc.), and even these techniques cannot completely eliminate those weak spots noted.

Figure 2:
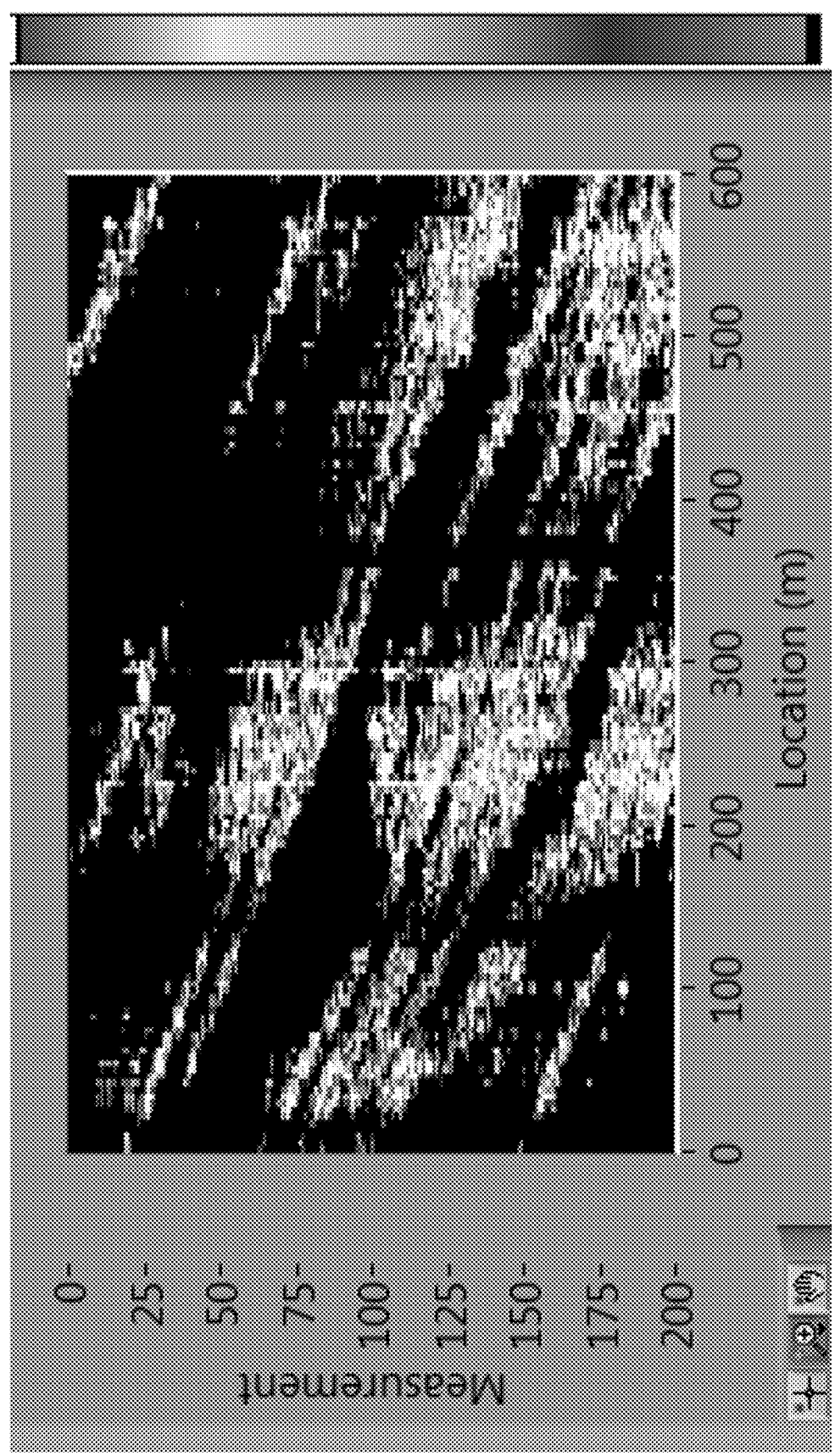
FIG. 2 is a plot showing an illustrative actual waterfall chart from a traffic sensor according to aspects of the present disclosure.

Combining the inconsistency in roadway cable deployment configurations (due to the fact that they were not intended to be used for sensing purpose) and the presence of weak and noisy spots on the sensing data, it is not suitable to directly use the existing roadway optical cable and DAS/DVS to calculate traffic information. FIG. 2 is an illustrative example of a waterfall plot captured from measurement over a deployed field cable. As shown, the lines are noisy, and there are weak locations around 150 m, 350 m, etc. Many vehicle traces are broken into multiple sections, even though in reality there were from the same vehicle travelling continuously.

Several actions can be taken to mitigate the signal noises without additional hardware. One first step is to perform digital filtering. By setting appropriate bandpass, high pass, or low pass filter profiles digitally, the signal outside the frequency band of interest can be removed. For traffic information detection, the signal of interest is the vibration generated by vehicle movement, which has relatively low frequency. Therefore, it is useful to filter out high frequency signal components to remove noises at those frequency regions.

The next step is to perform various types of digital signal processing. Such digital signal processing may advantageously include amplitude normalization, thresholding, interpolation, moving averaging, and time-space 2D denoising, etc.,—among others. These techniques can advantageously reduce noise to a certain level; however, they cannot completely eliminate noise and weak spots. Therefore, the resultant de-noised waterfall plot is still not good enough for directly produce the vehicle trace and calculate traffic information.

Filtering the Waterfall Plot to Enhance the Contrast of Vehicle Traces

One key innovative aspect of systems, methods, and structures according to aspects of the present disclosure is the effective enhancement of the contrast of real traces, while reducing the surrounding noise. As may be observed in FIG. 2, the vehicle traces—as they appear on the waterfall plot—are noisy. This noise prevents the direct extraction of the vector representation of the traces using standard image analysis techniques such as thresholding followed connected pixels analysis. Therefore, we advantageously employ a filtering step.

Since the traces have definite characteristics, we can use this knowledge to develop filters that will enhance their intensity while decreasing it for other non-trace elements. In particular the traces exhibit the following characteristics namely, 1):locally linear in shape; 2) Angled between 0 and 180 degrees; and 3) Constant thickness.

As those skilled in the art will readily appreciate, several embodiments of our inventive filtering step can be implemented. We note two filtering techniques that may be particularly effective, namely: 1) Convolution with structuring kernel bank; and 2) Deep-Learning-based contextual image prediction. While we have only identified two here, those skilled in the art will appreciate that other filtering techniques may be employed as well.

Structuring Kernel Bank

With respect to the filtering technique of convolution with structuring kernel bank, we note that such technique employs a bank of structuring convolution kernels pre-defined to capture lines of different thicknesses at different angles. Convolving these kernels with the image enhances linear segments (traces) while reducing intensity of other elements (noise).

In a first step of this technique, a set of structuring kernels are generated. We divide a 180-degree angle into N, equally-spaced angles; each one corresponding to a different direction. For example, if N is 12, each angle is 15 degrees apart, ranging from 0 degree to 165 degrees. Since waterfall data is directional temporally (i.e. there is a fixed direction as time processes), a trace only progresses in one direction along the time axis, and therefore all possible angles are between 0 and 180 degrees.

For each angle, a structuring kernel is generated by—for example a computer—which can be viewed as a straight line at the corresponding degree passing through the center. Therefore, N kernels are generated, and are labelled according to the respective angle. The size of the kernel depends on the resolution of the waterfall plot and heuristics from the physics of travelling vehicle (i.e. how much curve do we expect in the traces). Typically, a 15×15 pixel kernel is a useful size. The thickness of lines can be also varied, if necessary. However, this does multiply the number of convolution kernels and therefore increases the processing load.

Figure 3:
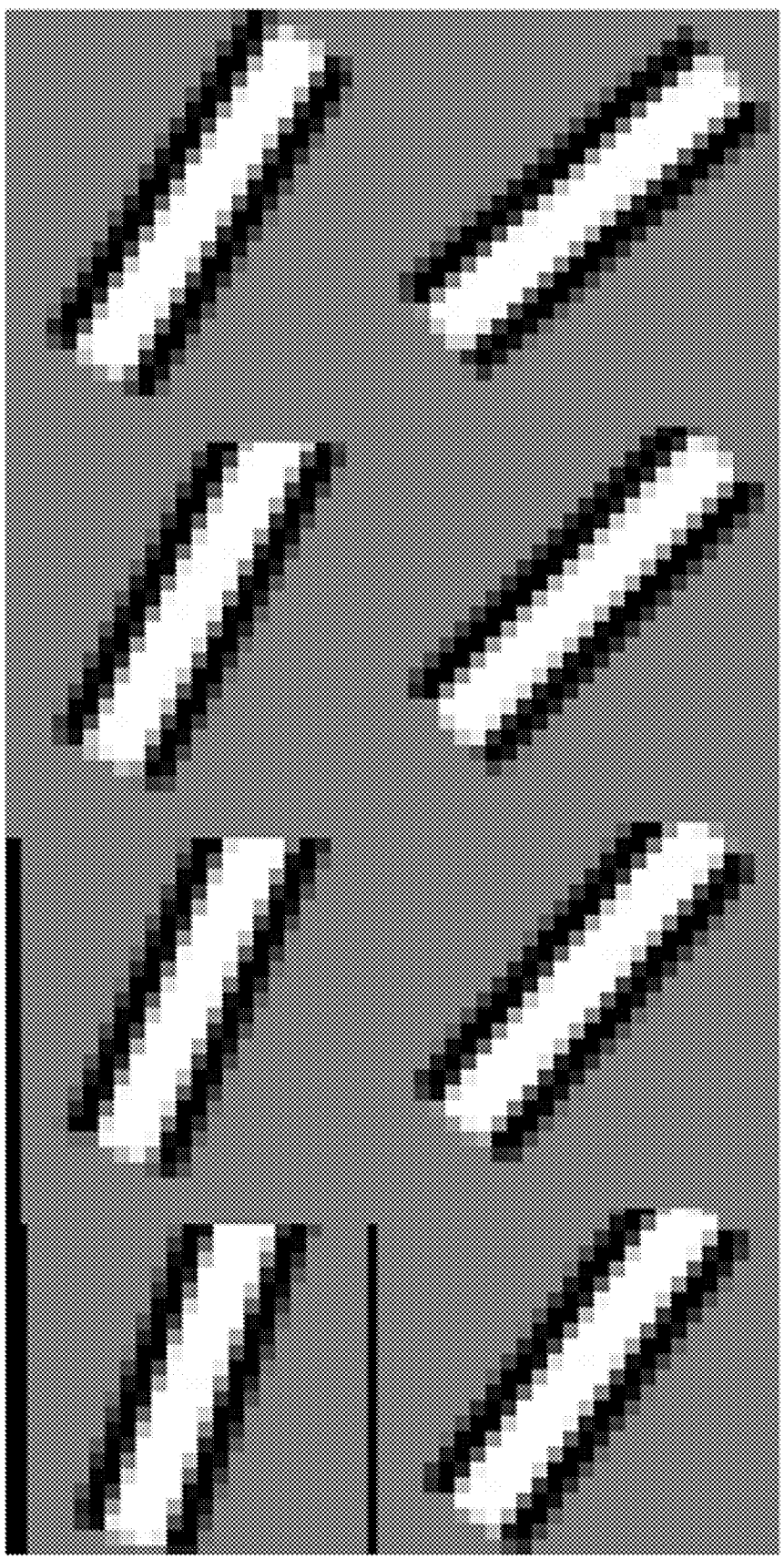
FIG. 3 is a schematic diagram showing an illustrative bank of 8 structural kernels with angles ranging from 20 to 48 degrees according to aspects of the present disclosure.

The value of N determines the angle resolution in the image processing. If N is small, the resolution is low (for example, if N is 4, the resolution is 45 degrees, i.e. ±22.5 degrees). If N is large, the resolution is finer. However, if N is too large, the processing complexity and time will be large also. In a traffic monitoring application, it might not be practical or necessary to calculate the speed of a vehicle down to a fine resolution such as 0.1 mph. Therefore, it is not necessary to set N too large. FIG. 3 shows the example of 8 generated structure kernels, one for each angle value from 20 to 48 degrees, in steps of 4 degrees.

Figure 4:
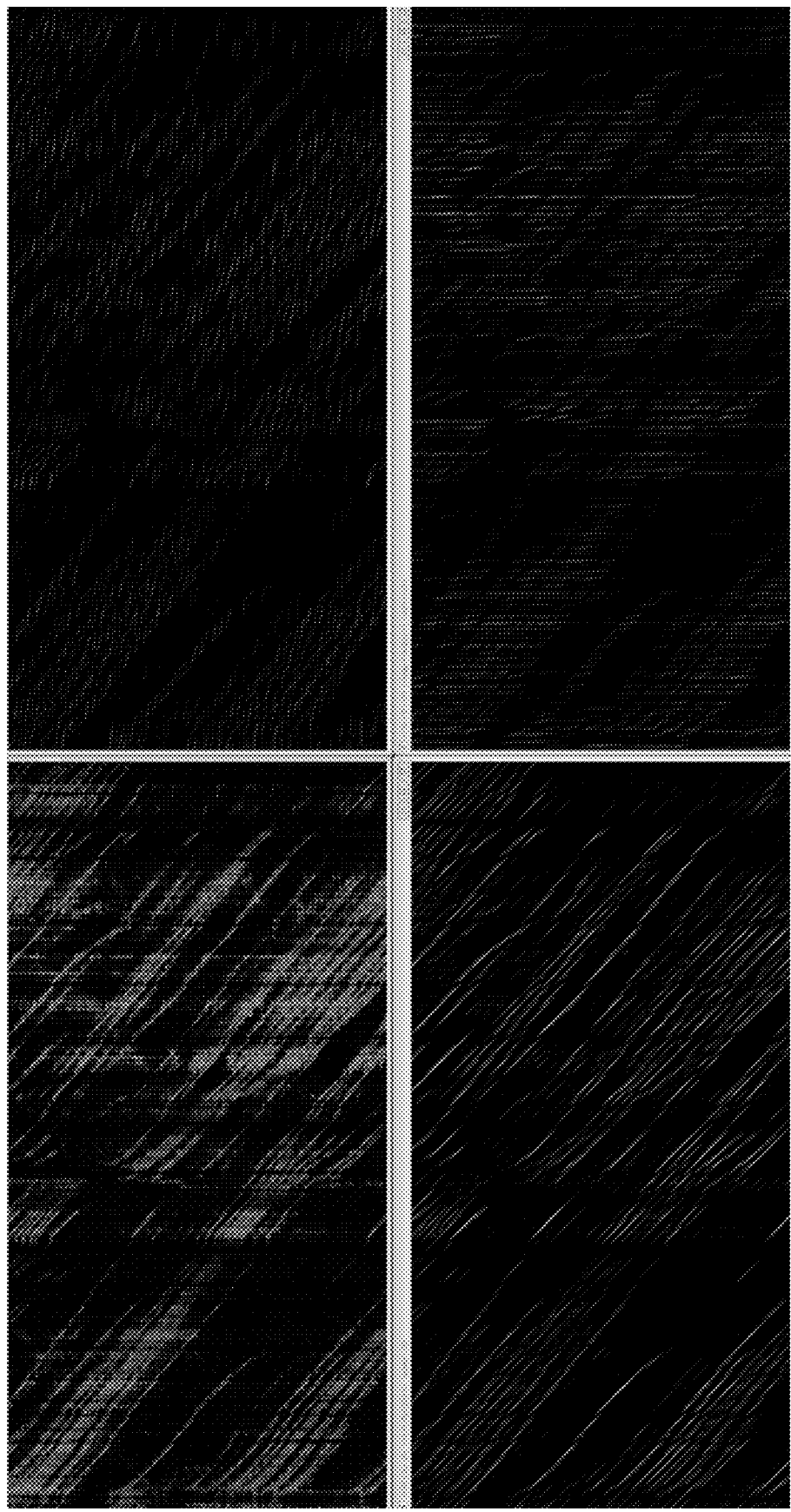
FIG. 4 is a series of plots showing an original waterfall plot (top left), convolution maps for three different angles (top right: 10; bottom left 40; bottom right 80) according to aspects of the present disclosure.

In the second step of this technique, the waterfall image is converted to a gray scale image and convolved with each kernel. For each angle, a resulting convolution map is obtained, such as shown in FIG. 4 where maps for angles 10 (almost horizontal), 40 and 80 (almost vertical) are shown to illustrate the striking difference in responses. Pixel intensity statistics may be computed on each individual map to obtain such information as the dominant speed.

Figure 5:
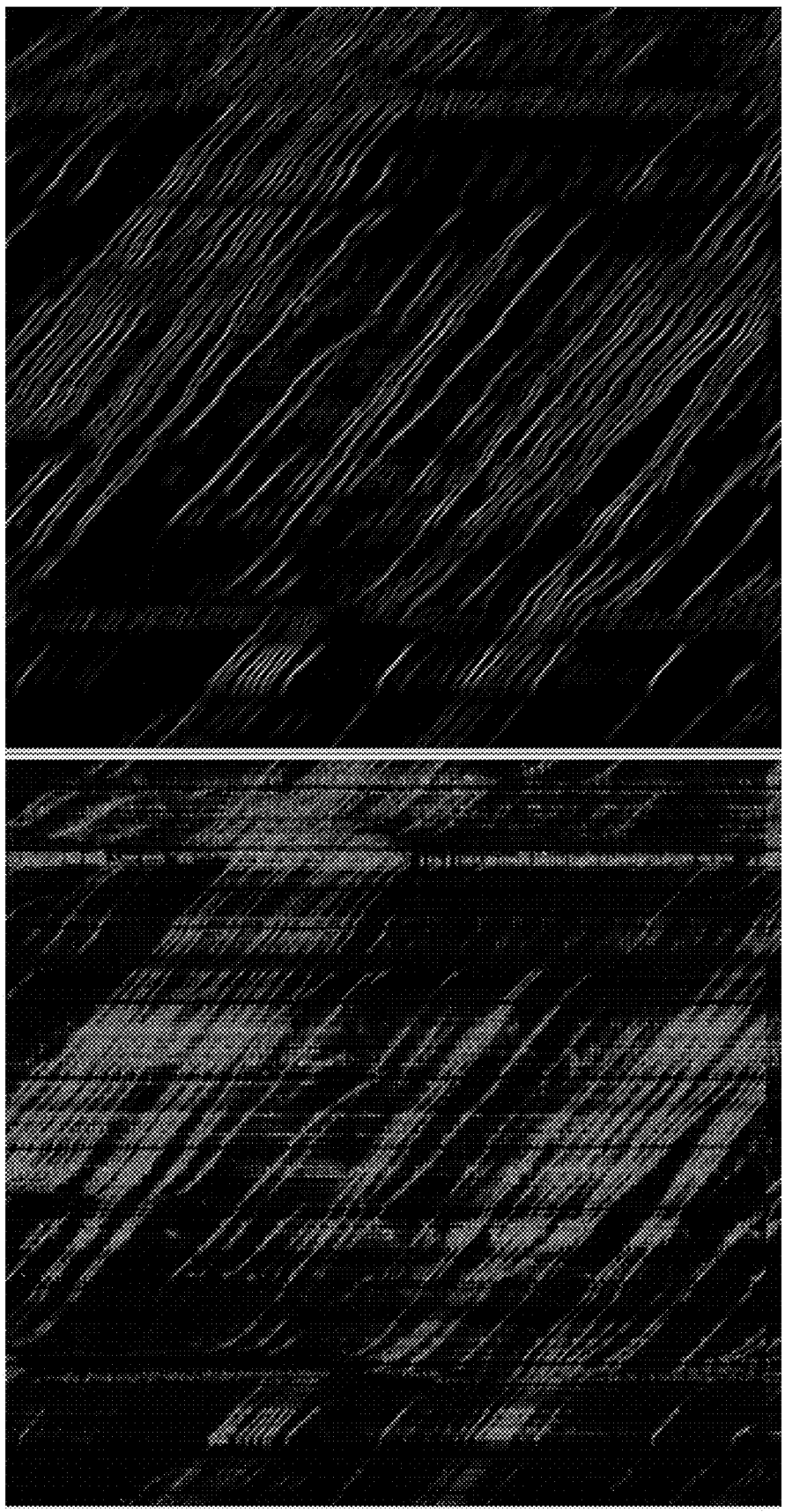
FIG. 5 is a pair of plots showing an original waterfall plot (left) and combined convolution map (right) according to aspects of the present disclosure.

All maps are then merged together using the maximum intensity (among all maps) at each pixel. A combined map using the following angles [20, 24, 28, 32, 36, 40, 44, 48] is shown on FIG. 5 (right). We notice that it effectively removes horizontal and vertical noise. The combined pixel map exhibits high intensity pixels at the location of traces and low intensity pixels elsewhere.

Deep-Learning Contextual Predictor

A second technique for the filtering uses recent advances in the field of deep learning. The goal is to learn from data how to enhance the traces. Since there is no real-world data that contains clean traces (i.e. waterfall plots always contain some degree of noise), we need to synthesize artificial waterfall plots to train the model.

Accordingly, a waterfall plot simulator is created to generate artificial plots. Parameters to the simulator include: 1) traffic rate 2) number of lanes in the roadway 3) minimum distance between vehicles 4) randomness parameters for changes of speed 4) types of vehicles (length, number of wheel, weight). The simulator is advantageously capable of generating a large number of waterfall plots, which can be used to train the model.

In one preferred illustrative embodiment, we employ a deep neural network model called Contextual Image Predictor (CIP). Other types of neural network may be used, such as auto-encoders. The CIP model will learn to predict an output image from a surrounding context, in other words, an output image that resembles a similar image from the training set. Hence, since the training images are clean traces, it will generate cleaned-up versions of traces from the noisy real-world waterfall image context.

Extracting Vector Representation of the Traces

From the pixel map of the filtered waterfall plot, we now extract a vectorized representation of each trace. Although traces are relatively linear, they still exhibit some degree of curvature, due to changes of vehicle speed (acceleration, deceleration). Hence, we cannot simply represent them with a straight line. Instead, a poly-line representation is used. Accordingly, each trace is represented by an ordered array of (X,Y) coordinates, where the first coordinate represents the beginning of the trace and the last coordinate the end of the trace. From this representation, extracting traffic information becomes a straightforward task.

From the filtered waterfall map, the first step is to extract high confidence trace snippets, or seeds. Such seeds may not represent entire traces, however they can be extracted with high confidence by thresholding the filtered map with an appropriate threshold value Thigh. The threshold Thigh should be chosen such that no resulting blob encompasses more than one trace. The resulting binary map contains elongated blobs of pixels as shown on FIG. 6 (left).

Figure 6:
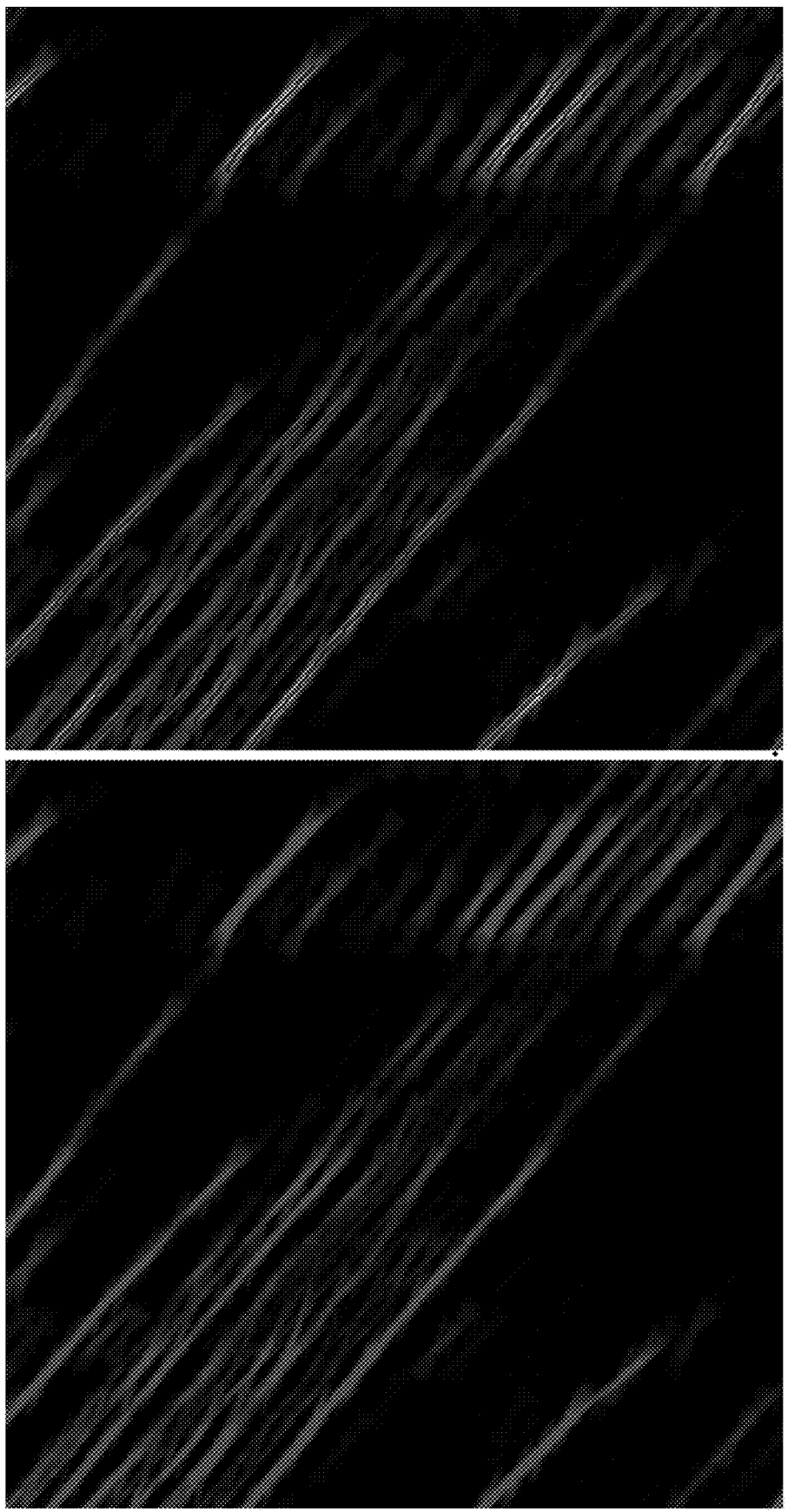
FIG. 6 shows overlaid blobs of seed traces (left) and Hildtich thinning vectorized lines (right) according to aspects of the present disclosure.

Using the known Hilditch thinning algorithm for skeletonization [Hilditch, C.J., Linear Skeletons From Square Cupboards, in Machine Intelligence IV (B. Meltzer and D. Mitchie eds), University Press, Edinburgh, 1969. 403-420. 17, 2, 1970. 339.], these blobs are converted to vectorized polylines. The result is shown in FIG. 6 (right).

We now go back to the filtered waterfall pixel map to try to extend seed traces using lower confidence pixels (pixels below the threshold intensity used to extract the seed blobs). Those pixels have lower intensity, indicating that the filtering process was only partially confident that it contains an actual trace. This can be the result of multiple traces being too close together to be cleanly separated by the convolution filters.

Figure 7:
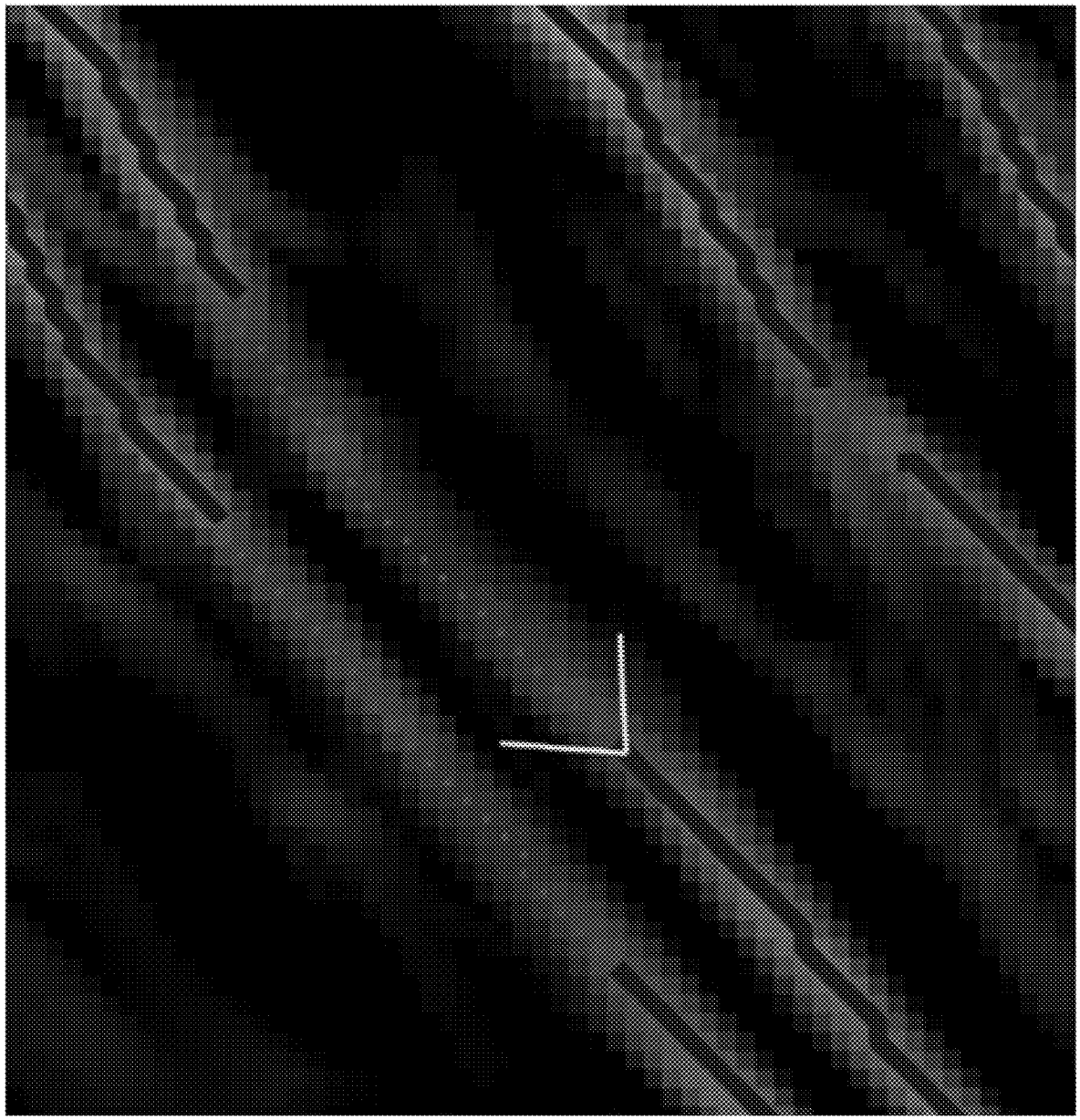
FIG. 7 is a plot showing illustrative reconnecting lines by following high ridges with intensity above $T_{low}$ with prospective pixels shown as dots and search beam shown in yellow according to aspects of the present disclosure.
Figure 8:
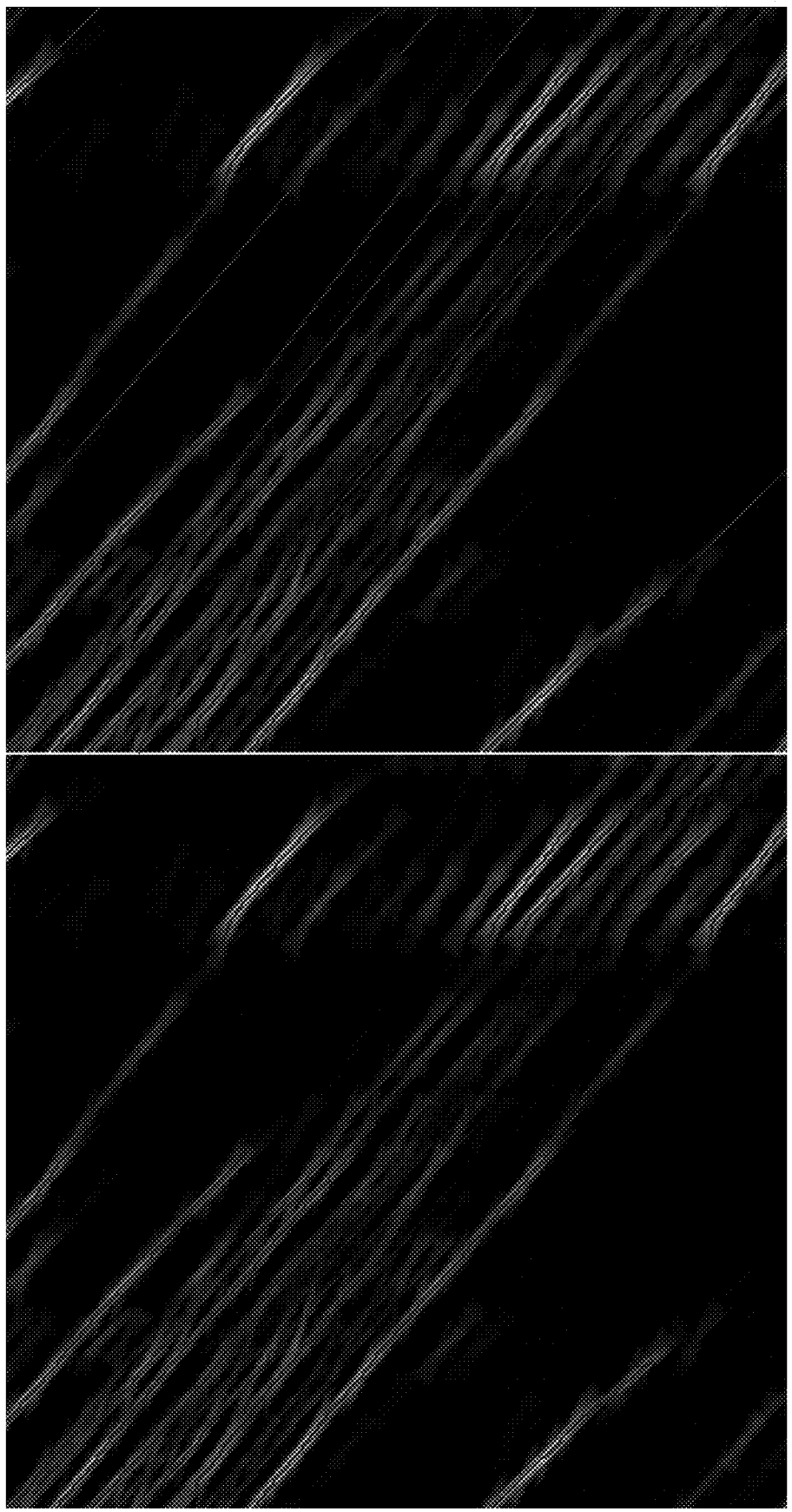
FIG. 8 is a pair of plots showing an illustrative waterfall plot with extended traces (left) and reconnected traces (right) according to aspects of the present disclosure.

Starting at a seed trace endpoint, the process attempts to follow a ridge of highest intensity pixels of the filtered waterfall map, while avoiding large changes in direction. FIG. 7 illustrates this process. The trace is progressively extended until no more high intensity pixels (as defined by a low intensity threshold Low) are found within the search beam. The threshold $T_{low}$ is chosen such that no non-trace pixel are included. An example of extended traces is shown in FIG. 8 (left).

Note that due to weak spots of Rayleigh Backscatter, there could still interruptions in a vehicle trace. These weak spots are clearly visible in FIG. 5 (left) as vertical bands (either dark or light). In these bands, traces tend to be interrupted, even in the filtered map where the pixel intensity may fall below $T_{low}$. To reconnect traces across these bands, we use a clustering approach where trace snippets that are co-linear can be reconnected. Parameters for this step are the tolerance in collinearity (delta-angle, delta-parallel, max-distance-to-reconnect). The resulting traces are shown on FIG. 8 (right).

Advantageously, our procedures for processing a 2D waterfall plot can be extended to real-time processing. As new rows of data are obtained from the fiber optic sensor, only a band of waterfall the height of the kernel size is used and constantly shifted by new arriving data. A single row (or multiple rows, for increased robustness) of processed pixels can then be used to track vehicles, represented by high intensity pixels moving to the right of the 1D map. The speed at which they move corresponds to the vehicle speed on the road.

Calculating Traffic Information

With respect to FIG. 8, we note that a trace corresponds to a moving vehicle. Therefore, at any given time, a list of vehicle traces is obtained. Each trace contains the X and Y coordinates of the consecutive points on the 2D image (the X axis going left to right encodes the position of the vehicle on the roadway, the Y axis going top to bottom encodes the time), starting from top-left to bottom-right (as the vehicles only move forward, the general direction of the traces is top-left to bottom-right). Given the sampling rate of the waterfall plot these (X, Y) locations on the waterfall image can be readily converted to real-world location (in meters) and time (in seconds).

At this point, those skilled in the art will readily appreciate that—according to aspects of the present disclosure—traces of vehicles contain all information needed for traffic monitoring. For example: 1) average speed of a vehicle can be deduced from the slope of the linear approximation of a trace; 2) average speed of all vehicle at any given point on the roadway can be obtained by the average slope of trace intersecting a given X coordinate; 3) time passage of a vehicle can obtained at a given X coordinate (this precise timing can be used to correlate speeding vehicles with those visible on regular traffic cameras positioned only at a few location along the roadway); 4) The vehicular rate at a given X coordinate by counting the number of traces intersecting that coordinate; 5) The vehicular rate at a given time by counting the number of traces intersecting a Y coordinate; 6) The average speed of all vehicles within a certain road section and/or within a certain period of time. Note that this information can be directly obtained from the kernel maps (without extracting the traces) by simply counting the number of pixels above a certain threshold in each map. The map with the largest number correspond to the dominant speed; 7) Vehicle acceleration and deceleration can be obtained from the change of slope within the traces. For example, X coordinates where traces intersect with a high change of slope, correspond to areas of high average deceleration and could be flagged as dangerous; and 8) High negative accelerations followed by a loss of trace could be a sign of an accident.

Utilization of Traffic Information

Of particular advantage, systems, methods, and structures according to aspects of the present disclosure may provide detail traffic information along long distances of roadway, continuously, with a single sensor, and does not require the installation of new sensing cable. Therefore, it is a practical and economical solution.

As those skilled in the art will further appreciate, the obtained traffic information can be applied in various applications, such as smart city management. For example, if high level of congestion is detected frequently at a certain section of the road, traffic pattern adjustment should be considered, such as changing the traffic rule and redirecting the traffic. If a vehicle fails to stop at an intersection with a stop sign, or if a vehicle travel in the opposite direction of the road, an alert can be sent to the traffic control authority. If all vehicles suddenly stop at a certain location, where no stop sign or traffic light is located, it is likely that a traffic accident occurs, and the response team will be notified.

Overall System

Figure 9:
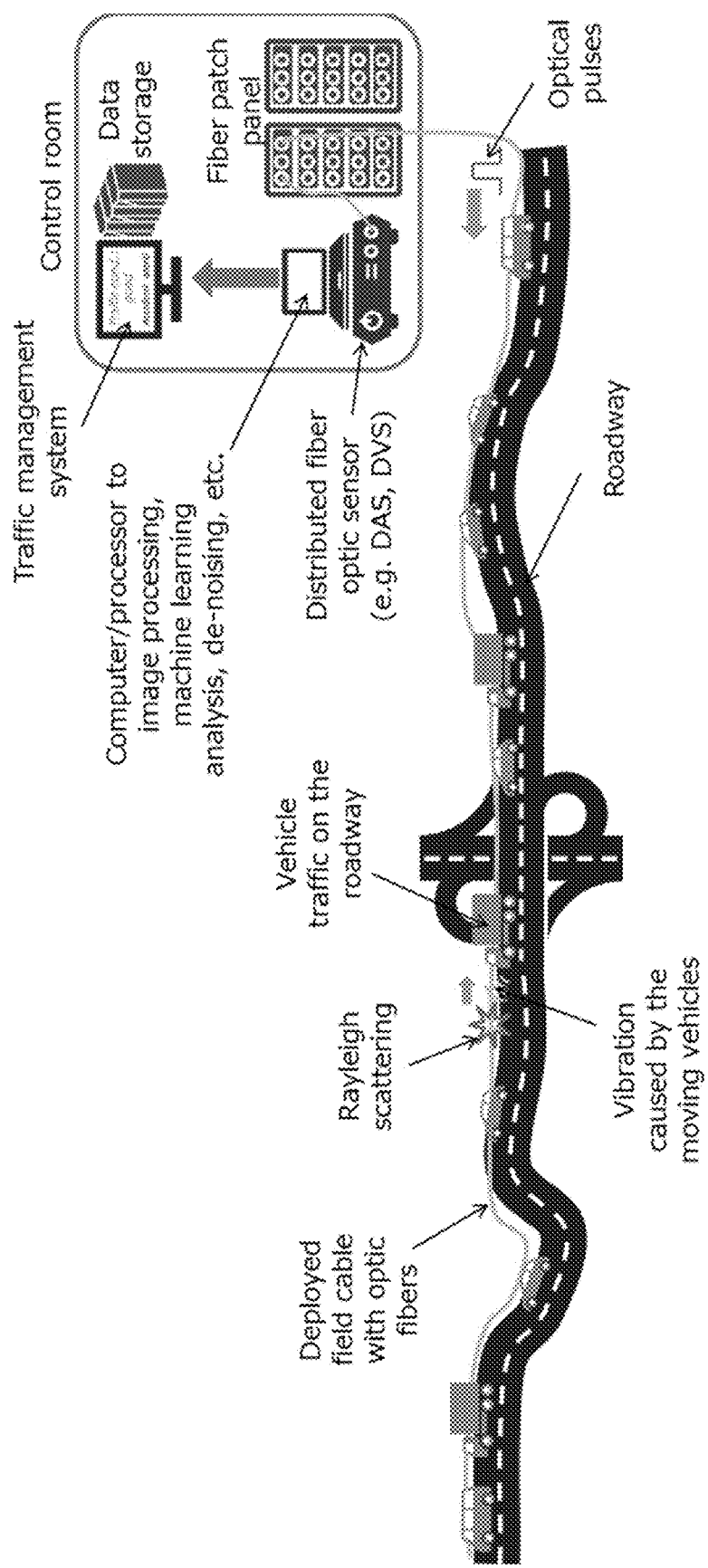
FIG. 9 is a schematic diagram showing an illustrative traffic monitoring system according to aspects of the present disclosure.

FIG. 9 is a schematic diagram of an illustrative system according to aspects of the present disclosure. With reference to that figure, and as shown, existing, fiber optic cables are shown deployed along a roadway. We note that they may not have been specifically deployed for roadway sensing/traffic monitoring purposes—purpose, which is illustratively shown by non-uniform distance(s) between the fiber optic cable and the roadway. Of course, systems, methods, and structures can also operate using dedicated fiber optic cable that are installed specifically for sensing purpose.

As illustratively shown in the figure, an optical fiber located in the cable is connected (in optical communication with) to the DFOS (e.g. DAS or DVS) shown located in a control room. Typically, there is a fiber patch panel in between the cable and the DFOS. Operationally, and as previously noted, the DFOS periodically emits optical pulses into the fiber, and receives return signals resulting from Rayleigh backscatter along the length of the entire fiber. These return optical signals are then processed to produce initial real-time waterfall plot(s), which is/are then de-noised to mitigate some noises and improve waterfall data quality. The de-noised waterfall image is then processed to enhance the image contract through structuring kernel bank convolution or deep learning-based contextual image prediction. The enhanced image is then processed to extract vehicle traces, which are then used to generate various traffic information.

The de-noising, contrast enhancement, vehicle trace extraction, and traffic information generation operations are performed by—for example—a computer. Advantageously, all steps described can advantageously be performed on a single computer, or separately among multiple computers—as application needs dictate. The computer(s) can be stand-alone desktop or laptop PC, or server. They can be located next to the sensor (on premise) or at remote location connected through data communication channels such as dedicated data communication links or the Internet (e.g. for cloud data server). Each computer can also be a microprocessor or a FPGA or an ASIC placed inside or next to the DFOS sensor hardware. FIG. 9 shows one of illustrative arrangement, where these operations are performed on a computer connected to the DFOS.

The traffic information is then sent to a traffic management system to be utilized. This system includes of one or more computer/processor/server, traffic management software, data storage, and response system (such as traffic light control, EMS response dispatch, police contact system, etc.). Similar to above, this system can be on the same location as the DFOS, or can be located remotely, such as in a central office, or in cloud server location.

Figure 10A:
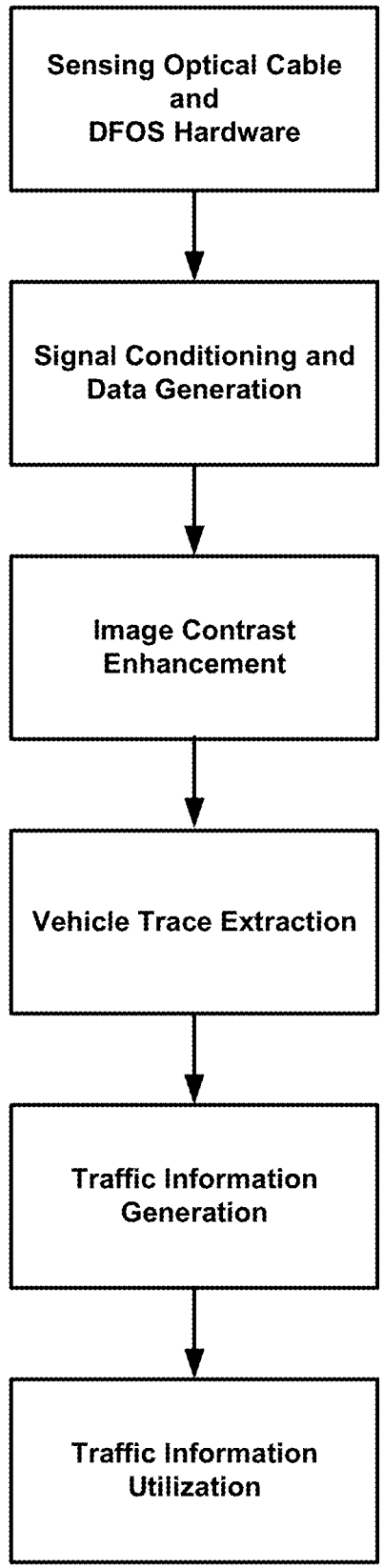
FIG. 10(A) is a schematic flow diagram showing an illustrative operational overview of a traffic monitoring system, method, and structure, according to aspects of the present disclosure.

FIG. 10(A) is a schematic flow diagram showing an illustrative operational overview of a traffic monitoring system, method, and structure, according to aspects of the present disclosure.

Figure 10B:
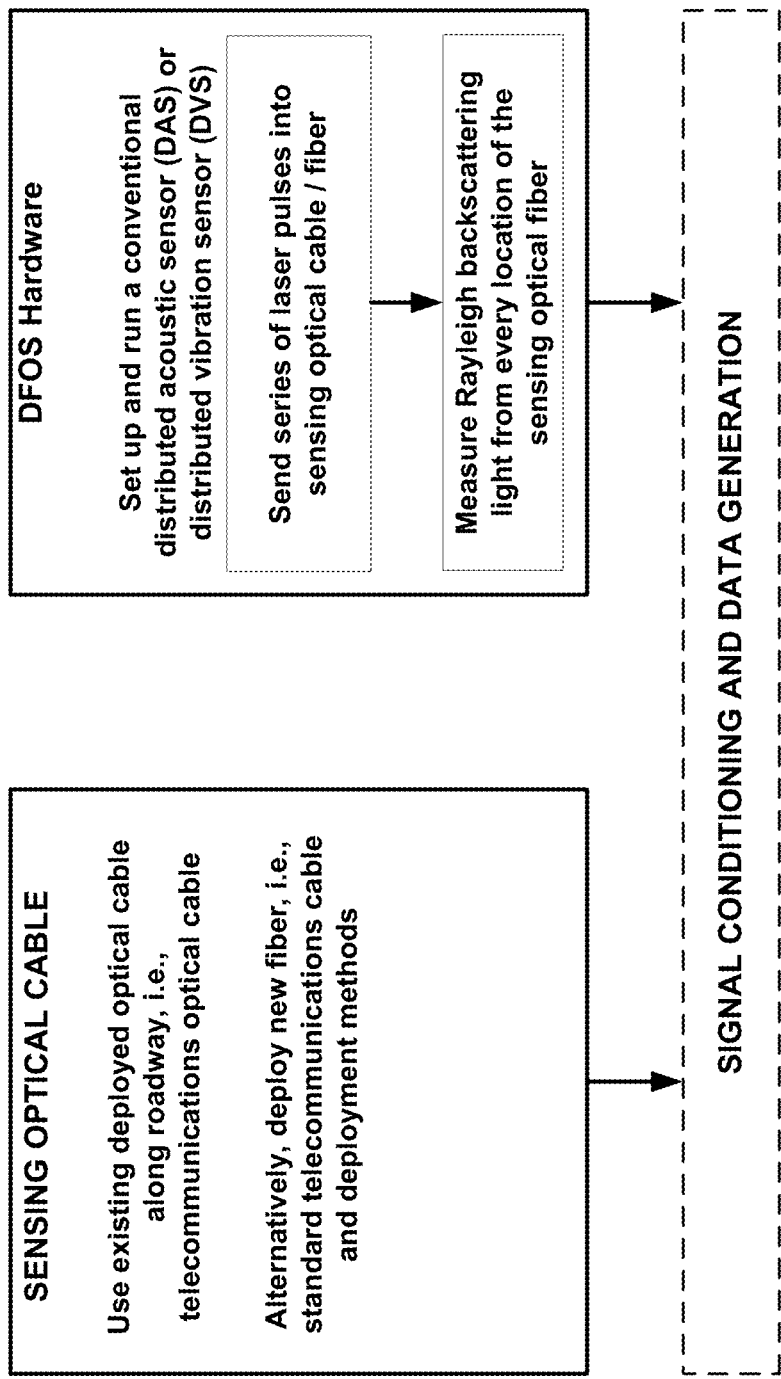
FIG. 10(B) is a schematic flow diagram showing illustrative sensing optical cable and DFOS aspects of a traffic monitoring system, method, and structure, according to aspects of the present disclosure.

FIG. 10(B) is a schematic flow diagram showing illustrative sensing optical cable and DFOS aspects of a traffic monitoring system, method, and structure, according to aspects of the present disclosure.

Figure 10C:
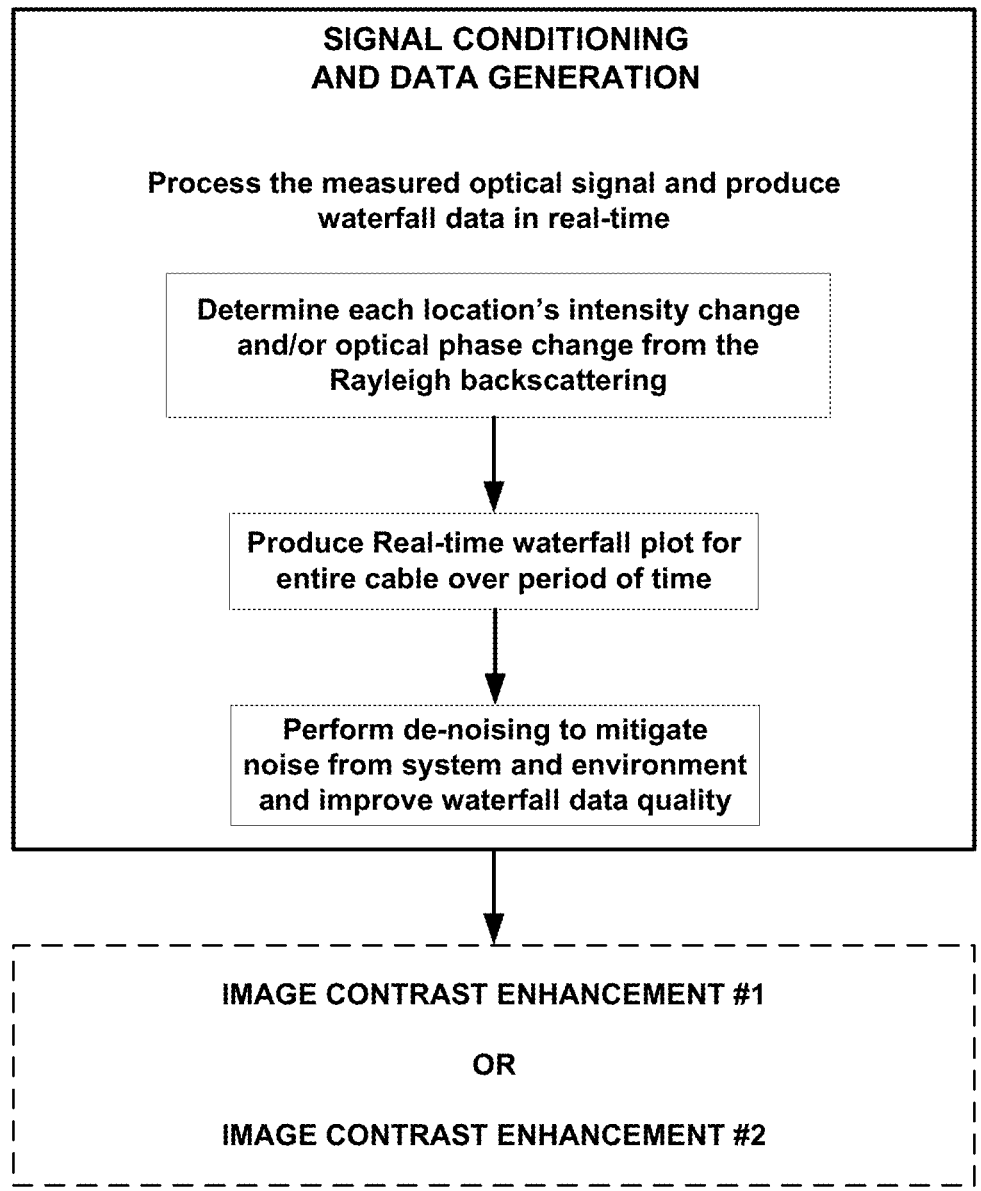
FIG. 10(C) is a schematic flow diagram showing illustrative signal conditioning and data generation aspects of a traffic monitoring system, method, and structure, according to aspects of the present disclosure.

FIG. 10(C) is a schematic flow diagram showing illustrative signal conditioning and data generation aspects of a traffic monitoring system, method, and structure, according to aspects of the present disclosure.

Figure 10D:
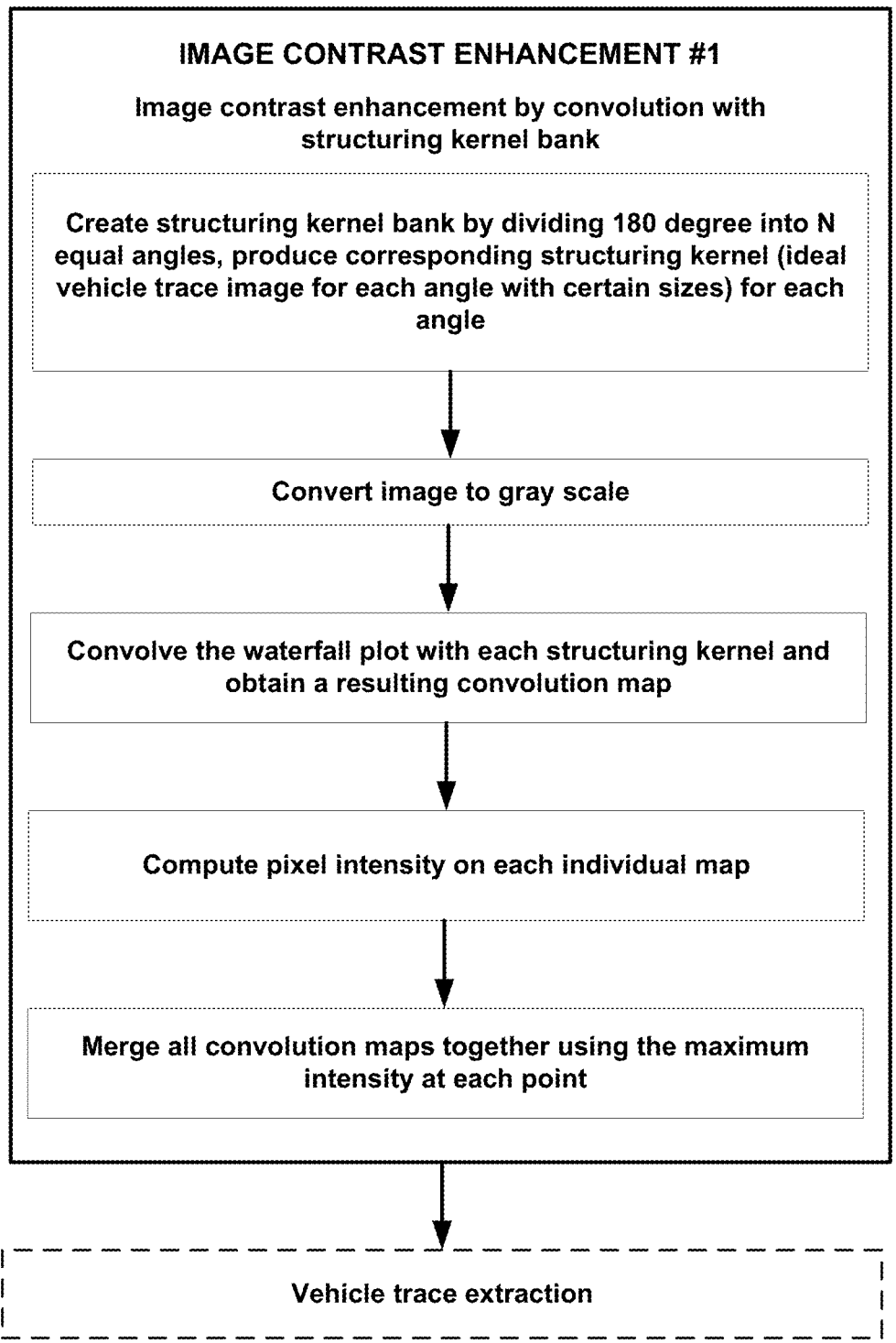
FIG. 10(D) is a schematic flow diagram showing illustrative first image contrast enhancement aspects of a traffic monitoring system, method, and structure, according to aspects of the present disclosure.

FIG. 10(D) is a schematic flow diagram showing illustrative first image contrast enhancement aspects of a traffic monitoring system, method, and structure, according to aspects of the present disclosure.

Figure 10E:
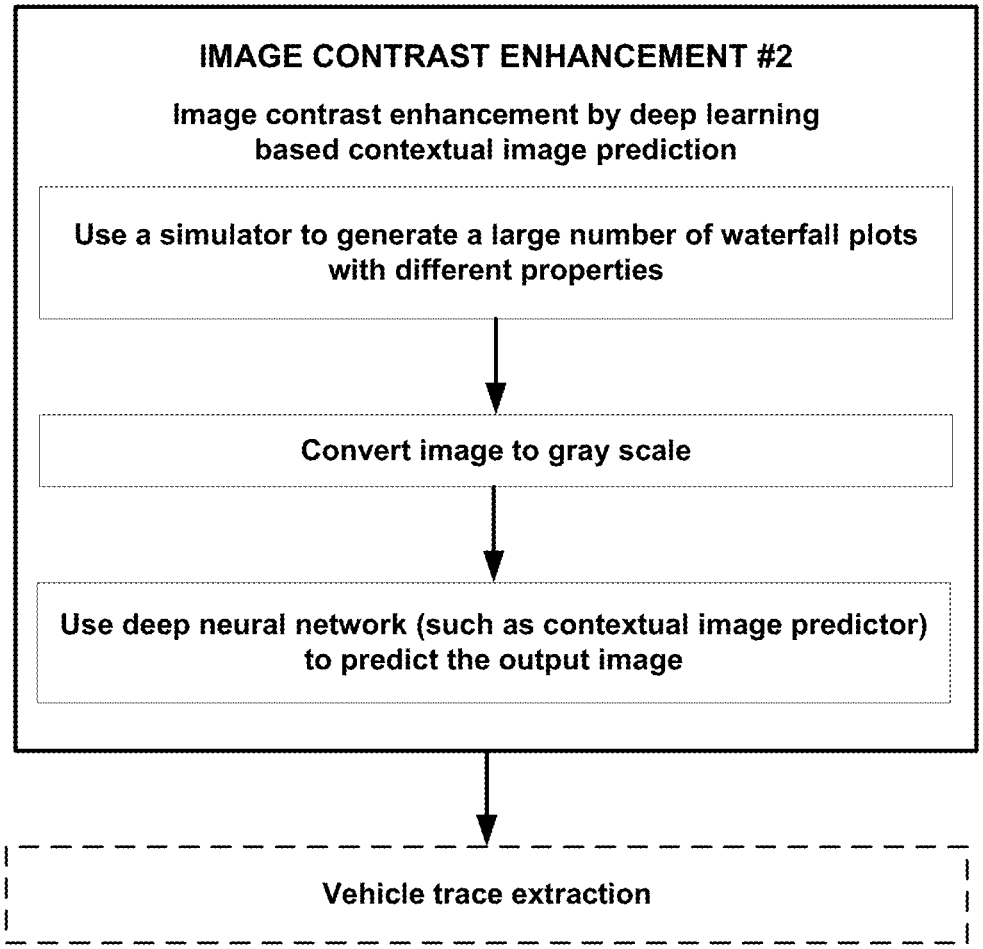
FIG. 10(E) is a schematic flow diagram showing illustrative second image contrast enhancement aspects of a traffic monitoring system, method, and structure, according to aspects of the present disclosure.

FIG. 10(E) is a schematic flow diagram showing illustrative second image contrast enhancement aspects of a traffic monitoring system, method, and structure, according to aspects of the present disclosure.

Figure 10F:
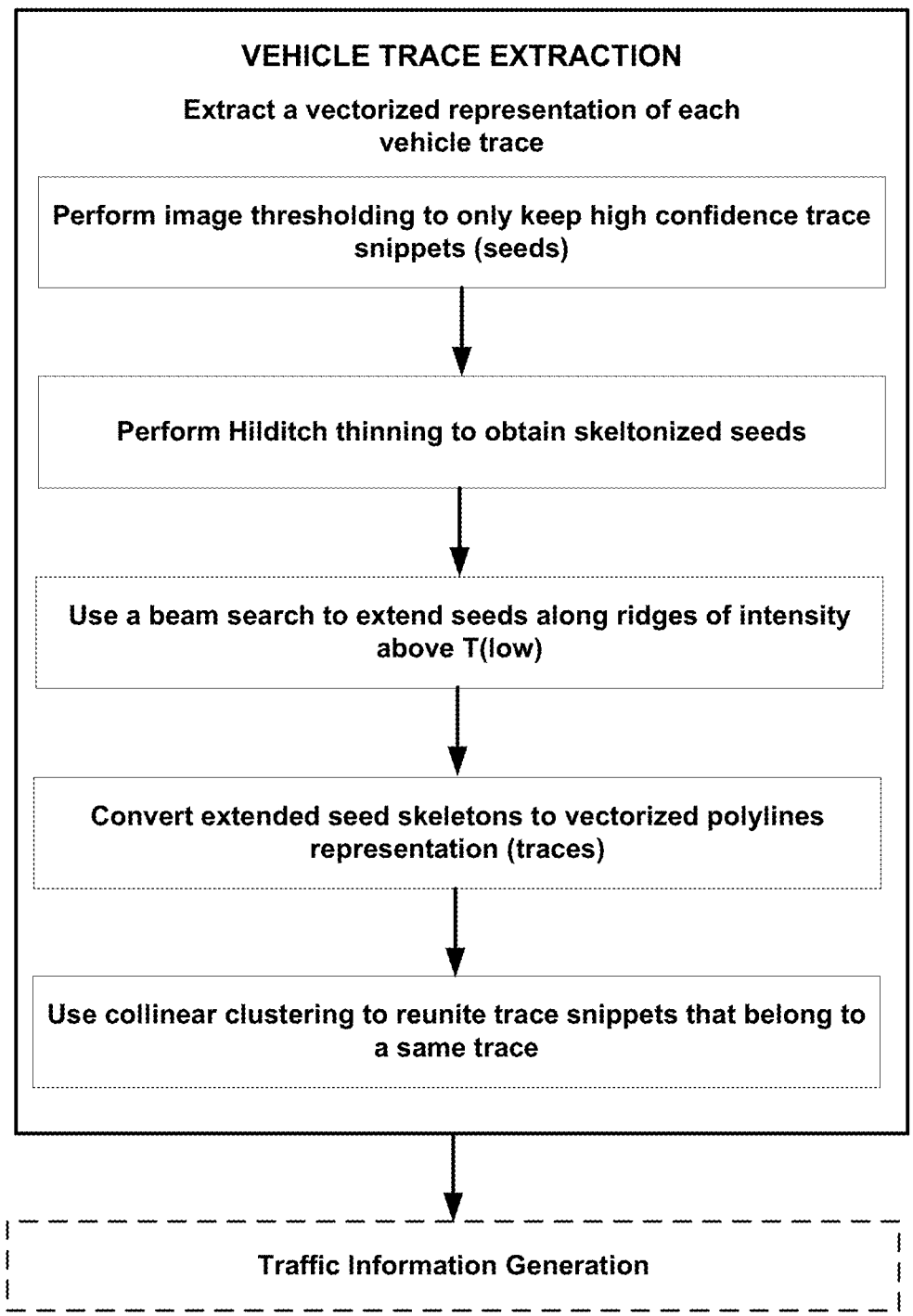
FIG. 10(F) is a schematic flow diagram showing illustrative vehicle trace extraction aspects of a traffic monitoring system, method, and structure, according to aspects of the present disclosure.

FIG. 10(F) is a schematic flow diagram showing illustrative vehicle trace extraction aspects of a traffic monitoring system, method, and structure, according to aspects of the present disclosure.

Figure 10G:
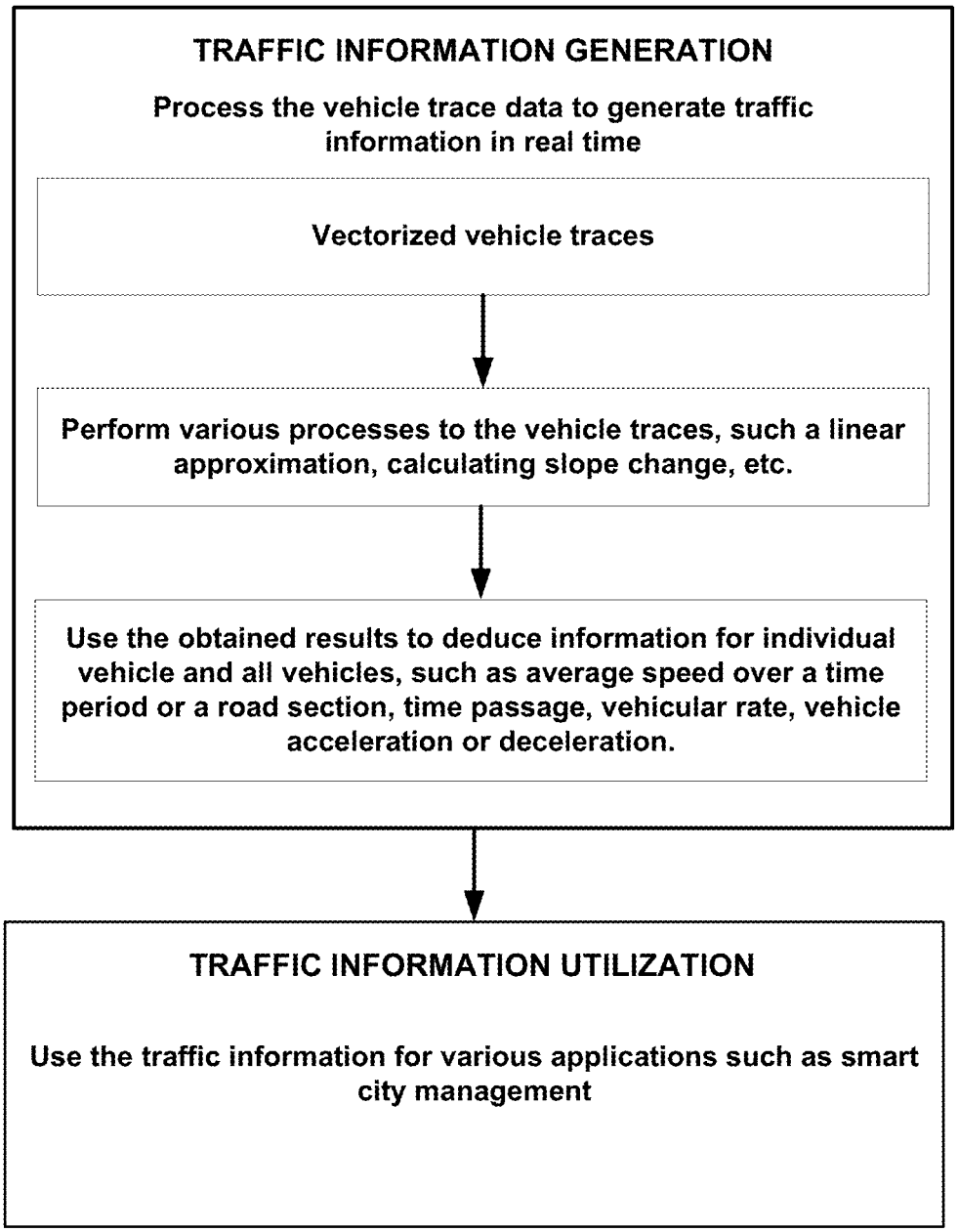
FIG. 10(G) is a schematic flow diagram showing illustrative traffic information generation and traffic information utilization aspects of a traffic monitoring system, method, and structure, according to aspects of the present disclosure.

FIG. 10(G) is a schematic flow diagram showing illustrative traffic information generation and traffic information utilization aspects of a traffic monitoring system, method, and structure, according to aspects of the present disclosure.

As should now be readily apparent to those skilled in the art, systems, methods, and structures according to aspects of the present disclosure may provide accurate traffic information at all locations along an entire roadway. Such information may advantageously be obtained in real-time, continuously, with fine spatial resolutions using existing fiber optic cables—including those conveying telecommunications traffic. Accordingly, appropriate traffic management which improves the safety and efficiency of a roadway traffic system is now made possible by systems, methods, and structures according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for traffic monitoring using distributed fiber optic sensing (DFOS), the method comprising:
    providing a DFOS system including:
        a length optical fiber cable positioned along a roadway;
        a DFOS interrogator system in optical communication with the optical fiber cable; and
        an intelligent analyzer configured to analyze Dims sensing data received by the DFOS interrogator system;
    operating the DFOS system produce Rayleigh backscattering light signal(s) from the optical fiber; and
    processing the backscattered light signals to generate a waterfall plot in real-time; the METHOD CHARACTERIZED BY:
        enhancing the waterfall plot image contrast;
        extracting a vectorized representation of vehicle traces in the enhanced plot image;
        generating real-time traffic information from the vectorized vehicle traces; and
        outputting an indicia of the generated real-time traffic information,
    wherein the waterfall plot image contrast is enhanced by one of a technique selected from the group consisting of: a convolution with structuring kernels, and a deep learning based contextual image prediction.

2. The method of claim 1, wherein the convolution with structuring kernels comprises:
    creating a bank of structuring kernels, covering a range of angles and widths; converting the image to gray scale;
    convolving the waterfall plot with each structuring kernel and obtaining a convolution map for each;
    computing a pixel intensity for each individual map; and
    merging all convolution maps using the maximum intensity at each pixel.

3. The method of claim 1, wherein the deep learning based contextual image prediction comprises:
    Offline, one-time generating a training set comprised of a plurality of waterfall plots, each having different properties through the effect of a simulator; and train a neural-network model to predict any part of the waterfall plot given its surrounding context for a waterfall plot, applying the trained model to predict an enhanced output image.

4. The method of claim 2, wherein the vehicle trace extraction includes:
    performing image thresholding on the waterfall images, keeping selected trace snippets (seeds)
    perform Hilditch thinning on the thresholded images to obtain skeletonized seeds;
    perform a beam search to extend seeds along ridges of intensities above a predetermined threshold;
    convert extended seed skeletons to vectorized polylines traces; and
    reuniting trace snippets that belong to a same trace through the effect of colinear clustering.

5. The method of claim 4, wherein the real time traffic information is generated by; processing the vehicle traces by linear approximation to deduce information for individual vehicles, wherein the individual vehicle information is selected from the group consisting of average speed over a time period, average speed over a roadway section, vehicle acceleration, and vehicle deceleration.

6. The method of claim 3, wherein the vehicle trace extraction includes:
    performing image thresholding on the waterfall images, keeping selected trace snippets (seeds);
    perform Hilditch thinning on the thresholded images to obtain skeletonized seeds;
    perform a beam search to extend seeds along ridges of intensities above a predetermined threshold;
    convert extended seed skeletons to vectorized polylines traces; and
    reuniting trace snippets that belong to a same trace through the effect of colinear clustering.

7. The method of claim 6, wherein the real time traffic information is generated by: processing the vehicle traces by linear approximation to deduce information for individual vehicles a wherein the individual vehicle information is selected from the group consisting of average speed over a time period, average speed over a roadway section, vehicle acceleration, and vehicle deceleration.

\* \* \* \* \*